United States Patent [19]
Holub et al.

[11] 3,922,252
[45] Nov. 25, 1975

[54] POLYAMIDEIMIDE COMPOSITIONS

[75] Inventors: Fred R. Holub, Schenectady; Peter J. Cacciotti, Rensselaer; Denis R. Pauze, Scotia, all of N.Y.

[73] Assignee: General Electric Company, Schenectady, N.Y.

[22] Filed: Sept. 10, 1973

[21] Appl. No.: 395,866

[52] U.S. Cl.................... 260/75 N; 260/77.5 AM
[51] Int. Cl.² .................................. C08G 18/00
[58] Field of Search ................ 260/75 N, 77.5 AM

[56] References Cited
UNITED STATES PATENTS

| | | | |
|---|---|---|---|
| 3,382,203 | 5/1968 | Rating et al. | 260/75 N |
| 3,458,480 | 7/1969 | Schmidt et al. | 260/75 N |
| 3,779,996 | 12/1973 | Pauze | 260/77.5 AM |

*Primary Examiner*—M. J. Welsh

[57] ABSTRACT

Polyamideimide compositions are prepared by reacting tricarboxylic anhydride and glycol and further reacting with polyamine and optionally polyisocyanate.

11 Claims, No Drawings

POLYAMIDEIMIDE COMPOSITIONS

This invention relates to an improved method of preparing polyamideimides and to the products obtained thereby which make them particularly useful for electrical insulation, coating applications and other uses. More particularly, the invention relates to the preparation of polyamideimides by reacting tricarboxylic anhydride with diol or glycol and then further reacting with polyamine and optionally polyisocyanate to provide an improved final material.

The preparation of polyamideimides by the reaction of tricarboxylic acid material and polyamines is basically well known, such reactions being set forth, for example, in U.S. Pat. No. 3,260,691 where, instead of the tricarboxylic anhydride as such, the mono acid chloride derivative of the anhydride is used. Of course, when the chloride derivative is used, some method must be devised as in the above patent for disposing of the unwanted chloride. When the anhydride is used as such, the process is fraught with other difficulties and is relatively long and expensive.

From the above it will be evident that there is a need for an improved method of making polyamideimides of the present type, and it is a primary object of this invention to provide such a process and the improved polyamideimides which are derived thereby.

Briefly, according to the present invention, the tricarboxylic acid anhydride material is reacted with glycol, the esterified material then being reacted with polyamine and optionally with polyisocyanate. All reactants except the isocyanate can be added together and reacted.

Those features of the invention which are believed to be novel are set forth in the claims appended hereto. The invention will, however, be better understood and further objects and advantages appreciated from a consideration of the following description.

Generally speaking, the tricarboxylic acid anhydride and diol or glycol are reacted in proportions ranging from about 1:2 to 3:1 or more, the reaction being carried out at a temperature of from about 150°C to 300°C, preferably at about 220°C, for such time as the theoretical amount of water is distilled off. Next, the polyamine in equivalent amount is added and the temperature maintained at about 200°C or higher up to about 250°C until the diol or glycol is essentially removed by azeotropic means. The viscosity or solids content of the resulting polyamideimide is adjusted as desired by the addition of appropriate solvents. While the products thus produced are useful and more readily made than by prior art processes, where exceptionally good flexibility and high cut-through as in the case of wire enamels are desired, polyisocyanate materials can be added to the enamel.

While trimellitic anhydride is preferred as the tricarboxylic acid material, any of a number of suitable tricarboxylic acid constituents will occur to those skilled in the art including 2,6,7-naphthalene tricarboxylic anhydride; 3,3',4-diphenyl tricarboxylic anhydride; 3,3',4-benzophenone tricarboxylic anhydride; 1,3,4-cyclopentane tetracarboxylic anhydride; 2,2',3-diphenyl tricarboxylic anhydride; diphenyl sulfone-3,3',4-tricarboxylic anhydride; diphenyl isopropylidene-3,3',4-tricarboxylic anhydride; 3,4,10-preylene tricarboxylic anhydride; 3,4-dicarboxyphenyl 3-carboxyphenyl ether anhydride; ethylene tricarboxylic anhydride; 1,2,5-naphthalene tricarboxylic anhydride; 1,2,4-butane tricarboxylic anhydride; etc. The tricarboxylic acid materials can be characterized by the following formula:

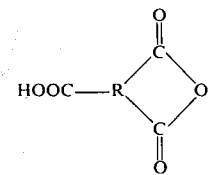

where R is a trivalent organic radical.

The aromatic polyamines useful in connection with the present invention are well known and may be expressed by the formula

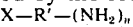

where R' is an organic radical and $n$ is at least 2, and X is hydrogen, an amino group or organic group including those also containing at least one amino group. Among the specific amines useful for the present invention, alone or in admixture, are the following:

4,4-diamino-2,2'-sulfone diphenylmethane
ethylenediamine
benzoguanamine
meta-phenylene diamine
para-phenylene diamine
4,4'-diamino-diphenyl propane
4,4'-diamino-diphenyl methane benzidine
4,4'-diamino-diphenyl sulfide
4,4'-diamino-diphenyl sulfone
3,3'-diamino-diphenyl sulfone
4,4'-diamino-diphenyl ether
2,6-diamino-pyridine
bis(4-amino-phenyl)diethyl silane
bis(4-amino-phenyl)diphenyl silane
bis(4-amino-phenyl)phosphine oxide
4,4'-diaminobenzophenone
bis(4-amino-phenyl)-N-methylamine
bis(4-aminobutyl)tetramethyldisiloxane
1,5-diaminonaphthalene
3,3'-dimethyl-4,4'-diamino-biphenyl
3,3'-dimethoxy benzidine
2,4-bis(beta-amino-t-butyl)toluene
toluene diamine
bis(para-beta-amino-t-butyl-phenyl)ether
para-bis(2-methyl-4-amino-pentyl)benzene
para-bis(1,1-dimethyl-5-amino-pentyl)benzene
m-xylylene diamine
p-xylylene diamine
bis(4-amino-cyclohexyl)methane
hexamethylene diamine
heptamethylene diamine
octamethylene diamine
nonamethylene diamine
decamethylene diamine
3-methyl-heptamethylene diamine
4,4'-dimethylheptamethylene diamine
2,11-diamino-dodecane
1,2-bis-(3-amino-propoxy)ethane
2,2-dimethyl propylene diamine
3-methoxy-hexamethylene diamine
2,5-dimethylhexamethylene diamine
2,5-dimethylheptamethylene diamine
5-methylnonamethylene diamine
1,4-diamino-cyclo-hexane
1,12-diamino-octadecane 2,5-diamino-1,3,4-oxadiazole
$H_2N(CH_2)_3O(CH_2)_2O(CH_2)_3NH_2$
$H_2N(CH_2)_3S(CH_2)_3NH_2$
$H_2N(CH_2)_3N(CH_3)(CH_2)_3NH_2$
polymethylene polyamine (Curithane)
and mixtures thereof.

Any polyisocyanate, that is, any isocyanate such as $R'''(NCO)_y$, having two or more isocyanate groups, whether blocked or unblocked, can be used. In the above formula $R'''$ is an organic radical and $y$ is at least 2. Blocked isocyanates using as the blocking constituent phenols or alcohols or complexed isocyanates can be used and in general provide a higher molecular weight final material which is advantageous as, for example, in varnishes. On the other hand, the unblocked isocyanates provide more flexible final materials. At any rate, the blocking material must be evaporated off as much as possible and there is no advantage from the reaction point of view to using the blocked material except as stated above. Typical of the blocked polyisocyanates is Mondur S wherein mixtures 2,4- and 2,6-tolylene diisocyanate are reacted with trimethylol propane and blocked by esterification with phenol in the proportions of three moles of isocyanate, one mole of trimethylol propane, and three moles of phenol. In Mondur SH, the isocyanate groups of mixed 2,4- and 2,6-tolylene diisocyanate are blocked by esterification with cresol or phenol, for example. Among the polyisocyanates which are useful alone or in admixture are the following:

tetramethylenediisocyanate
hexamethylenediisocyanate
1,4-phenylenediisocyanate
1,3-phenylenediisocyanate
1,4-cyclohexylenediisocyanate
2,4-tolylenediisocyanate
2,5-tolylenediisocyanate
2,6-tolylenediisocyanate
3,5-tolylenediisocyanate
4-chloro-1,3-phenylenediisocyanate
1-methoxy-2,4-phenylenediisocyanate
1-methyl-3,5-diethyl-2,6-phenylenediisocyanate
1,3,5-triethyl-2,4-phenylenediisocyanate
1-methyl-3,5-diethyl-2,4-phenylenediisocyanate
1-methyl-3,5-diethyl-6-chloro-2,4-phenylenediisocyanate
6-methyl-2,4-diethyl-5-nitro-1,3-phenylenediisocyanate
p-xylylenediisocyanate
m-xylylenediisocyanate
4,6-dimethyl-1,3-xylylenediisocyanate
1,3-dimethyl-4,6-bis-(b-isocyanatoethyl)-benzene
3-(a-isocyanatoethyl)-phenylisocyanate
1-methyl-2,4-cyclohexylenediisocyanate
4,4'-biphenylenediisocyanate
3,3'-dimethyl-4,4'-biphenylenediisocyanate
3,3'-dimethoxy-4,4'-biphenylenediisocyanate
3,3'-diethoxy-4,4-biphenylenediisocyanate
1,1-bis-(4-isocyanatophenyl)cyclohexane
4,4'-diisocyanato-diphenylether
4,4'-diisocyanato-diphenylmethane
4,4'-diisocyanato-3,3'-dimethyldiphenylmethane
4,4'-diisocyanato-3,3'-dichlorodiphenylmethane
4,4'-diisocyanato-diphenyldimethylmethane
1,5-naphthylenediisocyanate
1,4-naphthylenediisocyanate
4,4',4''-triisocyanato-triphenylmethane
2,4,4'-triisocyanato-diphenylether
2,4,6-triisocyanato-1-methyl-3,5-diethylbenzene
o-tolidine-4,4'-diisocyanate
m-tolidine-4,4'-diisocyanate
benzophenone-4,4'-diisocyanate
biuret triisocyanates
polymethylene polyphenylisocyanate Generally speaking, the organic solvents used for preparing the present materials are polar organic solvents such as cresol, phenol, cresylic acid and the like. Others which can be used are n-methylpyrrolidone (MP), pyridinedimethyl sulfone, dimethylacetamide tetramethylene sulfone, tetramethyl urea, dimethyl sulfoxide, dimethyl formamide, all of which are unreactive under reaction conditions with the other ingredients. If desired, the above solvents can be diluted with up to 40 percent or more by weight of high boiling petroleum fractions such as the Solvesso materials, various ketones typified by methylethyl ketone, alcohols, and the like.

While for some applications it is preferred from the point of view of the characteristics of the final product obtained to use tricarboxylic materials such as trimellitic anhydride and the like, the original carboxylic reactants can be in part aromatic dicarboxylic acid or anhydride typified by the terephthalic and isophthalic materials and benzophenone dianhydride, among others. Furthermore, up to 80 percent of such dicarboxylic material can be substituted by aliphatic dicarboxylic materials such as adipic, sebacic, azelaic, suberic, pimelic, oxalic, maleic, succinic, glutaric and dodecanedioic and fumaric acids. Also useful are amino acids such as amino-caproic or its lactam, caprolactam, and $C_4$ to $C_{12}$ amino acids.

Any of a number of diols or glycols having the general formula

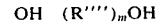
$$OH \ (R'''')_mOH$$

can be used where $m$ ranges typically from about 2 through 12 or higher and $R''''$ is preferably, although not necessarily, an alkyl group. Among such diols or glycols are ethylene glycol, propanediols, butanediols, pentamediols and hexanediols, octanediols, etc.

The following examples will illustrate the practice of the present invention, it being understood that they are not to be taken as limiting in any way.

EXAMPLE 1

To a glass container equipped with a stirrer, thermometer, Dean Stark trap, condenser and a nitrogen inlet, there were added 1 mole (62 g) ethylene glycol and 2 moles (384 g) trimellitic anhydride, the mixture being heated to 220°C, 16 cc of water being distilled off, indicating essential completion of the esterification reaction. Next, 2 moles (396 g) of methylene dianiline dissolved in 500 g of cresol were added to the reaction mixture, the temperature being maintained at 190°C. At this point, while 50 cc of Solvesso 100 were added, a mixture of high boiling petroleum fractions was added and the mixture heated until 56 g of ethylene glycol had been removed. Next, 956 g of cresol and 364 g of Solvesso 100 were added to provide a 32.6 percent solids solution. When this material was coated on wire and cured, the flex and cut-through, while useful, left something to be desired, indicating slow curing. When 8.35 g of toluene diisocyanate were added to the solution, the flex after coating and curing on wire was 1X and the cut-through was 240° – 250°C. The test methods for determining flex, cut-through and other wire enamel properties are pointed out and described in detail in U.S. Pat. No. 2,936,296 and elsewhere in the art, such properties and methods of testing being well known.

EXAMPLE 2

A container equipped as in Example 1 charged with 47 g azelaic acid, 144 g trimellitic anhydride, 54.25 g ethylene glycol and 100 g cresol, the mixture being heated to 200°C for about 3 hours, 15 g of water being removed indicating essential completion of the esterifying reaction. There was added to the above mixture a solution of 198.3 g of methylene dianiline dissolved in 500 g of cresol, the temperature being increased to 250°C and maintained for approximately 3 hours while 47 g of ethylene glycol were removed. An additional 695 g of cresol were added to the reaction mixture. To 500 g of the above reaction mixture were added 31 g of a 25 percent by weight solution of tolylene diisocyanate in cresol. When cast on aluminum and heated for 1 hour at 200°C and cooled, a flexible film resulted.

EXAMPLE 3

A reaction vessel equipped as in Example 1 was charged with 62 g ethylene glycol, 385 g trimellitic anhydride, and 100 g of cresol, the contents being heated to 200°C for approximately 3.5 hours, removing in the meanwhile the 25 g of water indicating completion of the esterification reaction. There was added to this mixture at 200°C a solution of 396 g methylene dianiline in 500 g of cresol, the temperature being increased to 250°C and maintained for approximately 3 hours to remove 55 g of ethylene glycol. Additional solvent consisting of 856 g of cresol and 364 g of xylene was added. To 500 g of the above solution there were added 34 g of a 25 percent by weight solution of tolylene diisocyanate in cresol. When cast on aluminum as in Example 2, a flexible film resulted.

EXAMPLE 4

A reaction vessel as in Example 1 was charged with 326.6 g trimellitic anhydride, 56.4 g azelaic acid, 89.9 g ethylene glycol and 100 g cresol, the contents being heated at 200°C for about 3 hours, removing 28.6 g of water indicating completion of the esterification of the acid material. There was added a solution of 396.6 g methylene dianiline in 500 g cresol, the temperature being increased to 250°C and maintained for about 3 hours, removing in the meanwhile 70 g of ethylene glycol. Additional solvent consisting of 1478 g of cresol and 520 g of xylene was added. To 500 g of the above reaction mixture, there were added 32 g of a 25 percent by weight solution of tolylene diisocyanate in cresol. A flexible film resulted when the material was cast on aluminum as in Example 2.

EXAMPLE 5

A vessel as in Example 1 was charged with 384.3 g trimellitic anhydride, 62 g ethylene glycol and 225 g of cresol, the contents being heated at 200°C for about 3 hours to remove 35 g of water. There was added a solution of 297.5 g of methylene dianiline in 500 g of cresol, the temperature of the mixture being increased to 250°C for about 3 hours, removing 45 g of ethylene glycol. Further solvent consisting of 656 g of cresol and 345 g of xylene was added. To 500 g of the above solution there were added 32 g of a 25 percent by weight solution of tolylene diisocyanate in cresol. Again, a flexible film resulted when the solution was cast on aluminum as in Example 2.

EXAMPLE 6

A vessel equipped as in Example 1 was charged with 11.25 g of 1,4-butane diol and 48 g of trimellitic anhydride, the contents being heated at 200°C until no further water was being collected. Then 49.5 g of methylene dianiline dissolved in 50 g of cresol were slowly added, the contents being heated for an additional 5 hours at 250°C, removing 9 g of butylene diol. Further solvent consisting of 132 g of cresol and 45 g of xylene was added yielding a good coating solution.

EXAMPLE 7

A reaction vessel equipped as in Example 1 above was charged with 364.8 g of trimellitic anhydride, 18.8 g of azelaic acid, 396.6 g of methylene dianiline, 79.36 g of ethylene glycol and 200 g of cresol, the contents being reacted at about 200°C to 220°C for about 7 hours, the reaction mixture then being diluted with 1156 g of cresol and 364 g of xylene. 500 g of the resulting mixture were left with 42 g of a 25 percent by weight solution of tolylene diisocyanate in cresol.

The above final materials after filtering were applied to 0.0403 inch diameter copper wire and cured at an oven temperature ranging from about 150°C at the bottom to 425°C at the top. In each case the indicated base coat was about 2 to 2.2 mils thick attained in four passes while the present material coating was about 0.8 to 1. mil thick obtained in two passes. In the table below are the results shown when the physical characteristics of enamel wire obtained when the present materials were applied as an overcoat over the indicated base coat.

EXAMPLE 8

Using the method of Example 1, trimellitic anhydride, methylene dianiline, ethylene glycol and azelaic acid were reacted in respective mole ratio of 95-100-50-5 with elimination of the ethylene glycol. There were then added 5 g of a 25 percent solution of methylene dianiline diisocyanate in cresylic acid. When the stirred and filtered material was coated on copper wire, the cut-through temperature was 420°C and the burn-out Overload Figure of Merit was 11.75.

| Polymer | Ex. 2 | Ex. 3 | Ex. 4 | Ex. 5 | Ex. 7 |
| --- | --- | --- | --- | --- | --- |
| Basecoat | Polyester | Polyester | Polyester | Polyester | Polyesterimide |
| Speed (fpm) | 10 | 10 | 10 | 10 | 10 |
| Flex 25% + Stretch X | 4X | 3X | 2X | 1X | 3X |
| Dieltric Str. (KV) | 8.5 | 9.2 | 9.7 | 9.8 | 6.8 |
| Burnout (OFM) | | 7.7 | 7.8 | 6.3 | 6.5 |
| Dissipation Factor, 210°C | 34.0 | 3.0 | 5.0 | 5.1 | 4.5 |

In addition to finding use as wire enamels, the present materials are useful as fluidized bed powders, molding compounds and as electrocoating compositions and coating compositions in general where corrosion resistance and good electrical insulating qualities are sought.

What we claim as new and desire to secure by Letters Patent of the United States is:

1. The process of preparing polyamideimide which comprises (a) reacting tricarboxylic acid anhydride material with diol, (b) reacting the reaction product of (a) with poly-primary amine in about equimolar amount with respect to said anhydride and (c) heating the reaction product of (b) to remove substantially all diol.

2. A process as in claim 1 where the final product is further reacted with polyisocyanate.

3. The process of claim 1 where the tricarboxylic acid material is trimellitic anhydride.

4. The process of claim 1 wherein a part of the tricarboxylic acid material is substituted with dicarboxylic acid material.

5. The process of claim 1 wherein the tricarboxylic acid material is trimellitic anhydride, the diol is ethylene glycol, and the polyamine is methylene dianiline.

6. The product obtained by the reaction of claim 1.

7. The product obtained by the reaction of claim 2.

8. The process of preparing polyamideimide which comprises reacting
   a. tricarboxylic acid anhydride material,
   b. diol, and
   c. poly-primary amine,
and heating said reaction product to remove substantially all diol.

9. The product of claim 8.

10. The process of claim 8 wherein the final product is further reacted with polyisocyanate.

11. The product of claim 10.

* * * * *

UNITED STATES PATENT OFFICE
CERTIFICATE OF CORRECTION

PATENT NO. : 3,922,252
DATED : November 25, 1975
INVENTOR(S) : Fred R. Holub, Peter J. Cacciotti, and Denis R. Pauze It is certified that error appears in the above-identified patent and that said Letters Patent are hereby corrected as shown below:

In the specification, insert before the first line the sentence

- This is a continuation of application Serial No. 265,715, filed June 23, 1972. -

Signed and Sealed this twenty-fourth Day of February 1976

[SEAL]

Attest:

RUTH C. MASON
Attesting Officer

C. MARSHALL DANN
Commissioner of Patents and Trademarks